N. W. GREEN
New Method of Joining Sections of Stove Pipe.
PATENTED JAN 28 1868
No. 73887
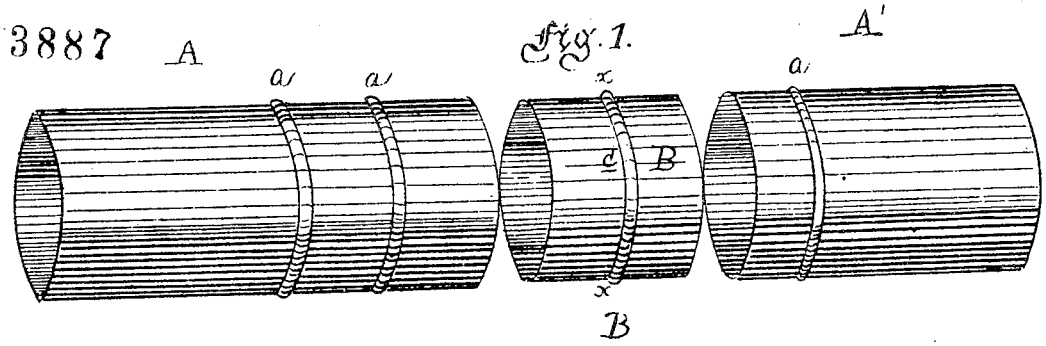
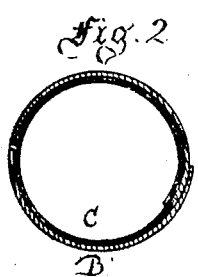
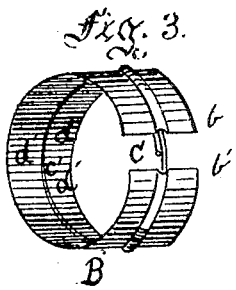
Witnesses
John D. Bloor
S. M. Boroney
Inventor
Nelson W. Green
per Holmead & Hollingshead
Attorneys

United States Patent Office.

NELSON W. GREEN, OF CORTLAND VILLAGE, NEW YORK.

Letters Patent No. 73,887, dated January 28, 1868.

IMPROVEMENT IN CONNECTING STOVE-PIPES.

*The Schedule referred to in these Letters Patent and making part of the same.*

TO ALL WHOM IT MAY CONCERN:

Be it known that I, NELSON W. GREEN, of Cortland Village, in Cortland county, and State of New York, have invented certain new and useful Improvements in the Method of Connecting the Sections and Lengths of Stove-Pipes; and I do hereby declare that the following is a full, clear, and exact description of my invention, reference being had to the annexed drawing, and to the letters of reference marked thereon, making a part of this specification, in which—

Figure 1 is a side view of two sections of ordinary pipe, with my improved short pipe or sleeve between the same, and ready for insertion.

Figure 2 is a plan view of my improved pipe and spring-rod.

Figure 3 is a side view of the same.

The object of my invention is to accomplish what, to successfully attain, has long been considered a great desideratum, viz, to devise a simple and practical device or method by which the sections or lengths of stove-pipes can be securely connected together, without the labor, delay, and trouble, which are incident to the plan now in universal use.

All who have ever had experience in "putting up" stoves, are aware how difficult, and indeed, sometimes, how almost impossible it is to properly adjust the ends of the sections of pipe, so that they will properly fit, and furnish a joint sufficiently tight to prevent the escape of smoke. In the present plan one end of the section of pipe has to be "flared out," while the other end of the section, with which it is intended to be connected, has to be "drawn in." The consequence is, that unless this is done with great care, you have a loose joint, with its attendant danger and inconveniences, such as fire, smoke, &c.

The nature of my invention is as follows: I take a short section of metal, say from two to eight inches, and form it precisely as I would do were I going to construct an ordinary pipe, with the single exception that the joint is left open, not closed or fastened, as is the case with the joint of the stove-pipe. I use for this short connecting-pipe, Russia iron, or any other suitable material. In the centre of the section there is a ridge, which may be "struck up," or produced by any other well-known means. This ridge is a convex groove, and of course projects a short distance beyond the outer surface of the pipe. The primary object of this ridge is to furnish a bearing-surface for the edge of the longer sections of the pipe to rest against when brought together, and enables me to form a tight joint, thus furnishing a secure means of uniting the sections of pipe.

It will be observed that, by leaving the joint of this short pipe open, owing to the natural elasticity of the metal, when not compressed and inserted in a pipe whose diameter is the same or less than its own, by its own act of expansion it will instantly bring its entire outer surface in contact with the inner surface of the pipe.

I now take two sections or lengths of pipe, which are constructed in the usual manner, with the exception of the ridge, now generally used to prevent one section of pipe from entering too far into the adjoining section, which is dispensed with, and the labor of "flaring out" the end of one section and the "drawing in" of the end of the other is also dispensed with. I then take the short pipe, which, owing to its horizontal opening or open joint, I can readily do, and lap one edge over the other. When in this condition, I am enabled, by slightly compressing the sides of the same, to so reduce its diameter that, if its circumference is such as will fill the largest pipe, it can readily be made to accommodate itself to the smallest. I then insert this short pipe into the ends of the two sections or lengths it is intended to connect, and then release the pressure, and the elasticity of the metal will instantly cause the sides of the short pipe so to expand that its entire circumference is closely encircled by the inner surface of the stove-pipe. The sections of the pipe are then pushed until they come in contact with the centre ridge, against which they fit closely, thus forming a neat, close, and secure joint.

In many cases the sleeve or connecting-pipe can be arranged and applied as above stated, but, in some instances, a greater amount of rigidity, however, is required. When the sections of the pipe are very heavy, or they are of great length, it may be found that the natural expansion of the open joint or sleeve is not adequate to successfully attain the desired end. In such cases I insert a ring, the length of which is less than the inner circumference of the connecting-pipe or sleeve. The ends of the rod of which this ring is formed are left detached. I insert this ring in the concavity of the centre ridge, care being taken that its free ends work in the rear of the groove and opposite the open joint or sleeve. This ring may be made of any suitable wire, and, when inserted, acts as a spring, with a constant tendency to expand the sleeve.

Among the great advantages of my invention may be enumerated the following:

First. Its great simplicity of construction and application. Any apprentice-boy in a tin-shop can as readily manufacture the same, so that it will operate as successfully as when made by the most skilled mechanic. Any servant in the family, no matter how ignorant or awkward he or she may be, can as readily unite the different sections of the stove-pipe as can any first-class workman engaged in the business.

Second. Its entire practicability, and the readiness with which it can be made to accommodate itself to pipes of any diameter, and also to connect pipes of unequal diameter. The head of every family well knows, in the fall of the year, the difficulty and perplexing vexation which the "putting up" the stoves for winter causes. The sections of the pipe have been misplaced, and it is frequently found almost impossible to find any two that will fit. During the spring and summer they have rusted, and if you attempt to hammer them to any extent the edges will "chip" and break off, and not unfrequently to such an extent as to render the pipe worthless. With my device all this labor and trouble are saved. A child, even, can press the sides of the connecting-pipe or sleeve until one edge envelopes the other sufficiently to allow of its easy insertion into the ends of the sections it is desired to unite. When sufficiently compressed a cord may be tied around the sleeve, then the latter is inserted, and the cord cut or untied, when the work is accomplished. In a connecting-pipe or sleeve constructed according to my plan, it can easily be compressed, so that the diameter of one end will be much smaller than the diameter of the other. Thus it will be perceived how readily my device will connect sections of different sizes, and no matter how old and rusty the same may be.

The third great advantage of my device is its cheapness. The expense of the material will only be a few cents, while the labor of construction will be nothing like so great as is required for "flaring out" one section and "drawing in" another, according to the present plan.

Another advantage is that, in long stove-pipes, the expense and labor of securing the same by wires attached to the ceiling and wall can be entirely dispensed with, the connecting-pipe forming, as it does, a coupling-sleeve of sufficient rigidity to securely support the pipe.

Thus it will be perceived that, at a most trifling expense, I furnish a device that is equally applicable to old, worn-out, rusty pipe as it is to new, one that will accommodate itself to pipes of all sizes, and also one that can as readily be used with pipes of unequal diameters as when the diameters are the same.

To enable others skilled in the art to make and use my invention, I will proceed to describe its construction and operation.

A A' are two sections or lengths of stove-pipe, constructed in the usual manner. The ridges $a\ a$ may be dispensed with, at the pleasure of the manufacturer. According to the plan now in use, in order to connect the sections A and A' together, the end of section A would have to be "flared out," while the end of A' would have to be "drawn in." This operation is very troublesome, and with old pipe almost impossible. According to my plan this labor is entirely dispensed with. B is a connecting-pipe or coupling-sleeve, and is constructed of any suitable material, and is made precisely as you form a stove-pipe, with the exception the ends $b$ and $b'$ are not united together, but are left perfectly open and free. This coupling or sleeve is constructed with a convex ridge, $c$, on its outer surface, which may be "struck up" or produced by any other ordinary means. This ridge, of course, will leave a concave recess or groove, $c'$, in the inner surface of the sleeve. In this groove $c'$, when increased rigidity is required, I insert a ring, C, constructed of any suitable wire. In order to fully illustrate the action and principle of this spring-ring C, I have shown the same in fig. 3, as being constructed longer than the sleeve, and with its free ends crossing the open joint left between the edges $b$ and $b'$. In actual application I do not so construct it. The ring is shorter than the sleeve, and its free ends work in the rear of the groove; for instance, if shown, as I construct them, their edges would be about $d\ d$, leaving a recess, $d'$, between the same.

The operation is as follows: I take the sleeve B, and compress the same until the edge $b$ will overlap the edge $b'$. This act of compressing may be continued until the diameter of the sleeve is reduced to any desired degree. The sleeve is then held in a compressed state until the same is inserted in the sections A and A', when the pressure is removed, and the sleeve instantly expands, and a secure and tight joint is immediately formed.

It will be observed that ridge $c$ will furnish a bearing-surface for the edges of the sections A and A' to rest against. It will also be observed that, should it be considered desirable at any time to lengthen the pipe a few inches, the same can be readily done, simply by slipping the pipe along the sleeve towards the edge of the same, and that, when additional rigidity is for any reason required, the spring-ring C can be inserted in the concave groove $c$.

Having thus fully described my invention, and the operation of the same, what I claim therein as new, and desire to secure by Letters Patent of the United States, is—

1. The open spring or elastic sleeve B, when the same is constructed substantially as described, and for the purpose specified.

2. The wire spring C, when the same is constructed so as to be applied substantially as described, and for the purpose specified.

3. The open spring or elastic sleeve B and the wire spring C, when the same are combined so as to operate substantially as described and for the purpose specified.

In testimony whereof, I have signed my name to this specification in the presence of two subscribing witnesses.

N. W. GREEN.

Witnesses:
  JOHN D. BLOOR,
  H. C. HOLLINGSHEAD.